(No Model.)

J. G. LIGHTFORD & J. H. FENTON.
QUARTER BOOT FOR HORSES.

No. 286,319. Patented Oct. 9, 1883.

Witnesses:
B. A. Price
Albert H. Adams

Inventor:
James G. Lightford
John H. Fenton
By West & Bond Attys.

UNITED STATES PATENT OFFICE.

JAMES G. LIGHTFORD AND JOHN H. FENTON, OF CHICAGO, ILLINOIS, ASSIGNORS TO SAID FENTON.

QUARTER-BOOT FOR HORSES.

SPECIFICATION forming part of Letters Patent No. 286,819, dated October 9, 1883.

Application filed September 18, 1882. (No model.)

*To all whom it may concern:*

Be it known that we, JAMES G. LIGHTFORD and JOHN H. FENTON, residing at Chicago, in the county of Cook and State of Illinois, and citizens of the United States, have invented new and useful Improvements in Quarter-Boots for Horses, of which the following is a full description, reference being had to the accompanying drawings, in which—

Figure 1:
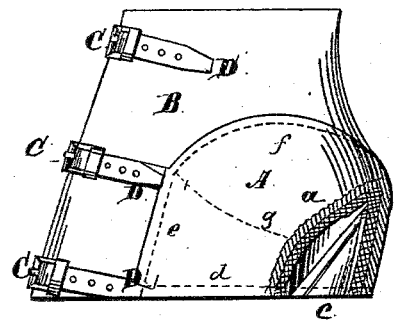
Figure 2:
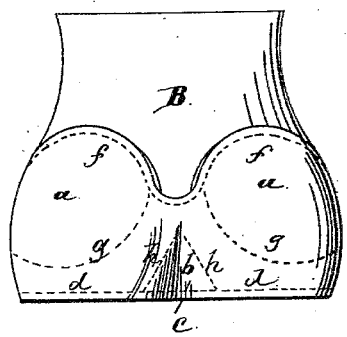
Figure 4:
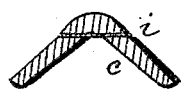
Figure 5:
Figure 3:
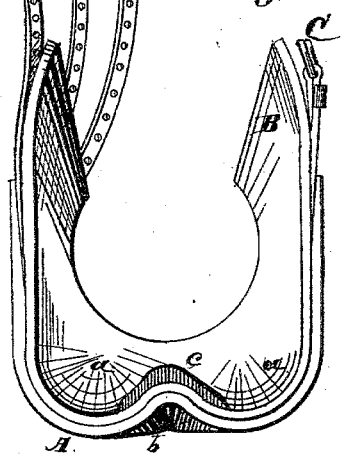
Figure 6:
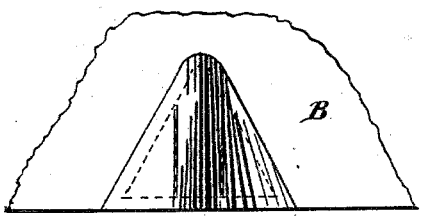

Figure 1 is a side elevation with a portion of the rear broken out. Fig. 2 is a rear elevation; Fig. 3, an edge view from the under side, showing the boot open; Figs. 4, 5, and 6, details showing the manner of stitching the lining and forming the indentation at the rear lower portion of the boot.

Quarter-boots are generally used on the front feet of horses for the purpose of preventing injury to the quarters and heels of the horse by the striking of the hind feet while in action, and they have been made in various forms and of different materials.

The object of this invention is to make a quarter-boot simple in construction, easily applied, and well adapted for the purpose for which it is intended; and this object we accomplish by the peculiar construction hereinafter described in detail, and pointed out in the claims.

In the drawings, A represents the main or body portion of the boot, which may be made of a piece of sole or other stiff leather or material, which can be placed in a die or former and stamped or otherwise pressed into shape, so as to form the cups $a$, to receive the quarters of the horse's feet, one on each side of the boot, as shown in Fig. 2, and an indentation, $b$, to fit into the indentation in the foot of the horse near the frog. The blank from which the body or main portion of the boot is formed is so cut that when pressed or otherwise formed into shape, its lower edge will be straight and its upper edge curved on each side, with a depression in the center, as shown in Figs. 1 and 2.

B is a lining, of felt or some other suitable material, somewhat longer than the leather or body of the boot, and somewhat wider than the width of the main portion or body, to encircle the hoof and leg of the horse above the hoof, as usual. This lining is secured to the leather or body portion by a row of stitching, $d$, at the lower edge, and side stitches, $e$, and a row of stitches, $f$, at the upper edge, and a row of stitches, $g$, on each side between the upper and lower rows, as shown in Figs. 1 and 2. The stitchings $f$ and $g$ are on the circle, so as to form an ovoid or egg shaped row of stitching for the cups or dish-shaped receptacles $a$, and by thus securing the lining and the body or leather portion the rows of stitching $f g$ assist in retaining the cups or dish-shaped receptacles $a$ in their ovoid or egg form, and also hold the lining approximately in contact with the body A with a free center, which allows it to yield, forming a cushion, and preventing hard pressure on the horse's feet, which would be liable to be the case if left unyielding. The indentation $b$ is stiffened by a secondary piece of leather or other suitable material secured to the inner face of the lining by the lower stitches, $d$, and a row of stitches, $h$, passing through the body A, lining B, and counter or stiffener $c$. This counter or stiffening-piece $c$ may be pressed or otherwise formed into shape to fit the indentation, and when made of stiff leather or other similar material it can be retained in shape by stitches $i$ running through the same, as shown in Figs. 4, 5, and 6, which stitching may also be used for attaching the counter to the stiffening-piece and to the lining. By providing indentations $b$, fitting the indentations in the hoof of the horse, the boot is prevented from turning to the right or left, and also held down to place at the rear, the extension forming a stop for these purposes.

C are straps and buckles, and D are straps by means of which the quarter-boot is attached to the foot of the horse in the usual manner. By making the body or leather portion of the boot from a single piece of leather pressed or otherwise formed into shape, a great saving of time and labor is produced, and a great advantage is gained over a quarter-boot made up of several pieces, as is now the custom. A smooth exterior is provided for the body of the boot, which cannot be torn or ripped off by being struck by the hind foot, as is liable to be the case where the boot is made up of several pieces secured together. The cups or dish-shaped receptacles will not tear or rip, as is the case where such cups or receptacles are made by slitting the leather and stitching the parts together, as has heretofore been the practice, all of which advantages add greatly to the utility of the quarter-boot.

We are aware that quarter-boots have been constructed of several pieces secured together and provided with cups for the quarters; also, that such boots have been made of a single piece of leather, with the cups formed by slitting and stitching the parts together; also, that quarter-boots have been indented at the heels and metallic stiffening used in the heels. Hence we do not claim, broadly, quarter-boots; but

What we claim as new, and desire to secure by Letters Patent, is—

1. A close-fitting quarter-boot for horses, having the quarters and heel formed of a single piece of leather, and stitched in ovoid form at the quarters to retain the shape, substantially as described.

2. A close-fitting quarter-boot made of a single piece of leather, constructed as described, and having the stiffening-piece stitched through near the point $a$, so as to retain its angular shape and preserve the outline of the boot, as shown.

JAMES G. LIGHTFORD.
JOHN H. FENTON.

Witnesses:
O. W. BOND,
ALBERT H. ADAMS.